US012499674B2

(12) United States Patent
Griffiths (10) Patent No.: US 12,499,674 B2
(45) Date of Patent: Dec. 16, 2025

(54) COMPUTER-IMPLEMENTED METHOD, DATA PROCESSING APPARATUS AND COMPUTER PROGRAM FOR OBJECT DETECTION (71) Applicant: Fujitsu Limited, Kawasaki (JP)

(72) Inventor: David Nicholson Griffiths, London (GB)

(73) Assignee: Fujitsu Limited, Kawasaki (JP)

( * ) Notice: Subject to any disclaimer, the term of this patent is extended or adjusted under 35 U.S.C. 154(b) by 385 days.

(21) Appl. No.: 18/101,133

(22) Filed: Jan. 25, 2023

(65) Prior Publication Data
US 2023/0298335 A1 Sep. 21, 2023

(30) Foreign Application Priority Data

Feb. 28, 2022 (EP) ................................. 22159287

(51) Int. Cl.
G06V 10/82 (2022.01)
G06V 10/764 (2022.01)

(52) U.S. Cl.
CPC ............ G06V 10/82 (2022.01); G06V 10/765 (2022.01); G06V 2201/07 (2022.01)

(58) Field of Classification Search
CPC ... G06V 10/82; G06V 10/765; G06V 2201/07
See application file for complete search history.

(56) References Cited

U.S. PATENT DOCUMENTS 11,157,744 B2   10/2021  Barzelay et al.
2019/0102678 A1*  4/2019  Chang ................. G06F 18/2415
(Continued)

FOREIGN PATENT DOCUMENTS

CN     108985334 A    12/2018
CN     112464879 A     3/2021
WO   2016/103651 A1    6/2016

OTHER PUBLICATIONS

Sun et al: "FSCE: Few-Shot Object Detection via Contrastive Proposal Encoding", 2021 IEEE/CF Conference on Computer Vision and Pattern Recognition (CVPR), IEEE, XP034006880, Jun. 20, 2021, pp. 7352-7362.

(Continued)

Primary Examiner — David F Dunphy
(74) Attorney, Agent, or Firm — XSENSUS LLP (57) ABSTRACT A computer-implemented method of training an object detector, the method comprising: training an embedding neural network using, as an input, cropped images from an image dataset, wherein training the embedding neural network is performed using a self-supervised learning approach and the trained embedding neural network translates input images into a lower dimensional representation; and training an object detector neural network by, for images of the image dataset, repeatedly: passing an image through the object detector neural network to obtain proposed coordinates of an object within the image, cropping the image to the proposed coordinates to obtain a cropped image, passing the cropped image through the trained embedding neural network to obtain a cropped image representation, passing an exemplar through the trained embedding neural network to obtain an exemplar representation, wherein the exemplar is a cropped manually labelled image bounding a known object, computing a distance in embedding space between the cropped image representation and the exemplar representation, computing a gradient of the cropped image representation and the exemplar representation with respect to the distance, and passing the gradient into the object detector neural network for use in backpropagation to optimise the object detector neural network.

20 Claims, 7 Drawing Sheets

(56) References Cited

U.S. PATENT DOCUMENTS

| | | | |
|---|---|---|---|
| 2020/0152333 A1* | 5/2020 | Tomasev | G16H 10/60 |
| 2021/0133623 A1 | 5/2021 | Amrani et al. | |
| 2021/0216828 A1 | 7/2021 | Ramaiah et al. | |
| 2022/0164585 A1* | 5/2022 | Ayvaci | G06N 3/088 |
| 2022/0175455 A1* | 6/2022 | Ungi | A61B 34/25 |

OTHER PUBLICATIONS

Khosla et al., "Supervised Contrastive Learning" 34th Conference on Neural Information Processing Systems (NeurIPS 2020), arxiv. org, Cornell University Library, XP081835152, Dec. 10, 2020, pp. 1-13.

Chen et al., "A Simple Framework for Contrastive Learning of Visual Representation", arxiv. org, Cornell University Library, XP081632474, Feb. 13, 2020, 11 pages.

Le Jeune et al., "Experience feedback using Representation Learning for Few-Shot Object Detection on Aerial Images", 20th IEEE International Conference on Machine Learning and Application (ICMLA), IEEE, XP034045785, Dec. 13, 2021, pp. 1-11.

Jean-Bastien Grill et al., "Bootstrap your own latent: a new approach to self supervised learning", arxiv.org, Cornell University Library, Jun. 14, 2020, XP081700812.

Mai Ngoc Kien "How to compute gradients in Tensorflow and Pytorch", medium.comn/codex, XP55945624, Retrieved from the Internet: URL: https://medium.com/codex/how-to-compute-gradients-in-tensorflow-and-pytorch-59a585752fb2, Apr. 9, 2021, pp. 1-7.

Paszke et al., "Automatic differentiation in PyTorch ", NIPS 2017 Workshop Autodiff Submission, 31st Conference on Neural Information Processing Systems (NIPS 2017), 2017, pp. 1-4.

Abadi et al., "TensorFlow: A System for Large-Scale Machine Learning" In 12th (USENIX) Symposium on Operating Systems Design and Implementation (OSDI'16), Nov. 2-4, 2016, pp. 265-283.

Johnson et al., "CLEVR: A Diagnostic Dataset for Compositional Language and Elementary Visual Reasoning", Proceedings of the IEEE Conference on Computer Vision and Pattern Recognition (CVPR), 2017, pp. 2901-2910.

Lin et al., "Focal Loss for Dense Object Detection", Proceedings of the IEEE International Conference on Computer Vision (ICCV), 2017, pp. 2980-2988.

Qi et al., "PointNet++: Deep Hierarchical Feature Learning on Point Sets in a Metric Space", Computer Vision and Pattern Recognition (cs.CV), arXivpreprint, arXiv:1706.02413v1 [cs.CV], Jun. 7, 2017, pp. 1-14.

Thomas et al., "KPConv: Flexible and Deformable Convolution for Point Clouds", Proceedings of the IEEE/CVF International Conference on Computer Vision (ICCV), 2019, pp. 6411-6420.

Yang et al., "Instance Localization for Self-Supervised Detection Pretraining", Proceedings of the IEEE/CVF Conference on Computer Vision and Pattern Recognition (CVPR), 2021, pp. 3987-3996.

Chen et al., "A Simple Framework for Contrastive Learning of Visual Representations", Proceedings of the 37th International Conference on Machine Learning, PMLR, vol. 119, Nov. 2020, pp. 1597-1607.

Chen et al., "Exploring Simple Siamese Representation Learning", Proceedings of the IEEE/CVF Conference on Computer Vision and Pattern Recognition (CVPR), 2021, pp. 15750-15758.

Redmon et al., "You Only Look Once: Unified, Real-Time Object Detection", Proceedings of the IEEE Conference on Computer Vision and Pattern Recognition (CVPR), 2016, pp. 779-788.

Liu et al., "SSD: Single Shot MultiBox Detector", Springer, Part of the Lecture Notes in Computer Science book series (LNIP, vol. 9905), In European Conference on Computer Vision, Oct. 2016, pp. 21-37.

Ren et al., "Faster R-CNN: Towards Real-Time Object Detection with Region Proposal Networks", Advances in Neural Information Processing Systems, vol. 28, 2015, pp. 1-9.

Girshick et al., "Rich Feature Hierarchies for Accurate Object Detection and Semantic Segmentation", Proceedings of the IEEE Conference on Computer Vision and Pattern Recognition (CVPR), 2014, pp. 580-587.

He et al., "Deep Residual Learning for Image Recognition" Proceedings of the IEEE Conference on Computer Vision and Pattern Recognition (CVPR), 2016, pp. 770-778.

Simonyan et al., "Very Deep Convolutional Networks for Large-Scale Image Recognition", Computer Vision and Pattern Recognition (cs.CV), arXiv preprint, arXiv:1409.1556v6 [cs.CV], Apr. 10, 2015, pp. 1-14.

Extended European Search Report mailed on Sep. 12, 2022, received for EP Application 22159287.6, 11 pages.

Bsun: "FSCE/fsdet/engine/defaults.py", Mar. 13, 2021 (Mar. 13, 2021), XP93031657, github.corn, Retrieved from the Internet: URL:https://github.corn/megvii-research/FSCE/blob/main/fsdet/engine/defaults.py [retrieved on 2023-03-14], 12 pages.

Papers With Code: "RoIPool Explained", Sep. 8, 2023 (Sep. 8, 2023), XP93080265, Retrieved from the Internet: URL:https://paperswithcode.corn/method/roi-pooling [retrieved on Sep. 8, 2023], 5 pages.

Extended European Search Report issued Sep. 20, 2023, in corresponding European Patent Application No. 22 159 287.6, 6 pages.

* cited by examiner

COMPUTER-IMPLEMENTED METHOD, DATA PROCESSING APPARATUS AND COMPUTER PROGRAM FOR OBJECT DETECTION

CROSS-REFERENCE TO RELATED APPLICATION

This application is based upon and claims the benefit of priority of the prior European Patent Application No. 22159287.6, filed on Feb. 28, 2022, the entire contents of which are incorporated herein by reference.

FIELD OF THE INVENTION

The present invention relates to object detection. In particular, the present invention relates a method for training an object detector, a data processing apparatus for object detection, a computer program for object detection, and a non-transitory computer-readable medium for object detection.

BACKGROUND OF THE INVENTION

Object detection is a computer vision technique for locating instances of objects in images or videos. Object detection algorithms typically utilise machine learning (ML) or deep learning (DL) to produce meaningful results. When humans look at images or video, the human may recognise and locate objects of interest almost immediately. The goal of object detection is to replicate this intelligence using a computer.

The field of object detection deals with detecting instances of semantic objects of a certain object class (such as humans, buildings, cars, etc.) within images or videos. Object detection is a fundamental task in the field of computer vision. An object detector is therefore a system that maps a set on input images to a vector containing the pixel coordinates of all objects in the image. Recent advances in the field have introduced weakly-supervised object detection and self-supervised representation learning for the purpose of object detection.

Current state-of-the-art object detection methods are based on supervised DL approaches. Supervised training of DL systems requires very large manually labelled datasets, where a label is a manually annotated images (typically by human), listing coordinates of all objects in an image dataset. This has several primary inefficiencies when creating a working system.

Firstly, the collection and manual labelling of data is typically the costliest aspect of training a model. While large datasets do exist for 2D images (less so for 3D), these only cover a small subset of object classes and almost never cover those needed for real-world applications. Rather, the primary purpose of such datasets is to aid research and algorithm development. Therefore, for a given commercial use case, the developer is responsible with collecting and labelling a large amount of use case specific training data, which adds a significant time and monetary cost for the project.

Secondly, this incurred cost and time often becomes a limiting factor with respect to the size of the training dataset. As DL systems require a very dense sampling of the input domain, and the domain for most object detection tasks is very large, even large manually labelled datasets are unlikely to densely cover the entire domain. Accordingly, the overall performance of the detection system is affected.

Lastly, manual labelling is not a trivial task, even for trained users. Many objects within images are either highly occluded or hidden by image artefacts such as sensor noise. This may make the labelling process ambiguous. The result of this is inaccurate labels, caused by a bias introduced by the human visual system. In training an object detector with such data, the bias is also introduced into the detector.

One of the most important limitations of current object detectors is that they need to be trained on huge amounts of labelled data. The need for large scale labelling increases both the cost of the project and also limits the detection accuracy, as there is only a limited amount of data that can be labelled under typical budget and time constraints of most projects.

The present invention addresses training a standard DL-based object detection system with less labelled data, achieved using self-supervised learnt representations. Although embodiments are described with respect to 2D data (for example, image data), embodiments may also be applied to 3D data; that is, the word "image" will carry both the meaning of 2D image (e.g., represented by pixels) and 3D scene (e.g., represented by voxels or a point cloud).

SUMMARY OF THE INVENTION

According to an aspect of the invention, there is provided a computer-implemented method of training an object detector, the method comprising training an embedding neural network using, as an input, cropped images from an image dataset, wherein training the embedding neural network is performed using a self-supervised learning approach and the trained embedding neural network translates input images into a lower dimensional representation (of the input images). The method further comprises training an object detector neural network by, for images of the image dataset, repeatedly: passing an image through the object detector neural network to obtain proposed coordinates of an object within the image; cropping the image to the proposed coordinates to obtain a cropped image; passing the cropped image through the trained embedding neural network to obtain a cropped image representation; passing an exemplar through the trained embedding neural network to obtain an exemplar representation, wherein the exemplar is a cropped manually labelled image bounding a known object; computing a distance in embedding space between the cropped image representation and the exemplar representation; computing a gradient of the cropped image representation and the exemplar representation with respect to the distance; and passing the gradient into the object detector neural network for use in back propagation to optimise the object detector neural network.

As a preliminary stage, the method involves training an embedding neural network. An embedding network is a neural network that learns to map a high dimensional input, such as an image, into a more compact low-dimensional (notional) space, thus reducing dimensionality. That is, the lower dimensional representation is a representation of the input image that comprises fewer features than the input image. Image processing systems often work with high-dimensional datasets that represent an image that has individual raw pixel intensities. However, an image in its raw dense form might not be very useful for some tasks. For example, consider the task of finding photographs similar to a reference photo. Comparing raw pixels of an example input picture (1028×1028) to another picture to find whether the two are similar is neither efficient nor effective. However, extracting lower-dimensional feature vectors (embeddings) for the image provides some indication of what the image includes, removes potentially redundant features, and may lead to a better comparison at lower computational cost.

This training process uses crops of images (that is, cropped images) in a self-supervised approach, thereby removing the need for the operator to manually label embedding training images. Cropping (both here in the embedding network training and in the object detector training) removes an amount (either random or user-defined) of the periphery of each image.

A trained embedding network is used in the training of an object detector neural network. The skilled person will appreciate that the training of the embedding network may need not be performed simultaneously with the training of the object detector network; that is, a pre-trained embedding network may be used.

An object detector network accepts, as an input, an image and outputs coordinates of objects detected within the images (and a class of object bound or enclosed within the coordinates). An untrained object detector will most likely output proposed coordinates that do not accurately enclose target objects. By iteratively repeating the training process, the object detector improves its estimation of proposed object locations.

Embodiments enable training of object detectors with a substantial reduction in the costliest component of conventional training methods-namely, the manual labels. Without the need for the extensive data used for training to be labelled, embodiments require labelling of only one or a small number of representative examples of the objects that need to be detected (exemplars).

The inventors have come to the realisation that it is possible to out-perform what conventional detectors may achieve under similar budgets. Current dataset sizes are typically limited because of the need to manually label the data; removing the requirement for intensive use of manual labels therefore opens the potential to train with much larger datasets than those used at present. As modern AI systems are fully data-driven models, embodiments provide the potential to create object detection systems that also out-perform conventional systems on overall performance.

Moving from dense label-based training to exemplar-based breaks the correlation between dataset samples and labels. Exemplar-based training requires in the best case scenario a single label per class for the entire dataset. This significantly decreases the cost and time of collecting training data for object detection systems.

The ability of training without dense labels allows for training to utilise large unlabelled datasets. This may potentially lead to an increase in the upper-bound performance of an object detection system.

Preferably, optimising the object detector during a training process involves backpropagation using the gradient of some loss function, where gradient(s) (in embedding space or weight space or parameter space) may be determined using a finite-difference method. That is, a method that approximates derivatives or gradients using finite differences between the embedding representation(s) of shifted images passed through the trained embedding network and embedding representation(s) of exemplars passed through the trained embedding network.

Preferably, optimising the object detector involves minimisation of the distance(s) between embedding representation(s) of cropped images passed through the trained embedding network and embedding representation(s) of exemplars passed through the trained embedding network. In this context, the distance(s) between representations is the $L_1$ distance in n-dimensions within embedding (or learned metric) space.

Preferably, optimising the object detector involves minimising some loss function, for instance a $L_1$ (that is, minimising the error of the sum of all absolute differences between all embedding representations). Alternatively, or additionally, a "focal loss" loss function may be minimised (that is, a modified cross-entropy loss, with a tuneable focusing parameter, as introduced in the work of Lin, T, et al. "Focal Loss for Dense Object Detection"). The skilled person will recognise that other loss functions (or combinations thereof) may be implemented, for instance an $L_2$ loss function.

Preferably, for improved operation of the object detector, the images used for training the object detector are uniform in size (for example, in the case of 2D images, all of the same aspect ratio and the same height and width). As an example, a 2D image size of 64×64 pixels may be used and obtained by resizing images of any arbitrary size. Where resizing requires increasing the number of pixels, interpolation may be used. Resizing may occur before or after cropping training images.

Preferably, exemplars may be uniform in size. That is, if there are multiple exemplars, each may be the same size as all other exemplars. The exemplars may be resized such that they are the same size as training images (for training the object detector) passed through the trained embedding network. In this way, variation between embedding representations due to deviation in input size may be minimised and the accuracy of the embedding mappings may be improved.

Preferably, training the object detector may use multiple exemplars. It is advantageous if there is at least a single exemplar provided for each class of object (or intra-class object, where applicable, for instance each type of vehicle within the object class of vehicle). Use of an excessive number of exemplars may negatively affect (in respect of time and/or resource consumption) optimisation procedures. An upper limit may be 50, 100, 200 or even 500 exemplars. As an example, for an autonomous vehicle object detector, 100 exemplars is a suitable upper bound for the number of car class exemplars. Where multiple exemplars are provided, distances may be determined between embedding representation(s) of cropped images passed through the trained embedding network and all embedding representations of exemplars passed through the trained embedding network.

Preferably, training the embedding neural network may involve methods, which—for a given (target) representation, train a new, potentially enhanced representation by predicting the target representation. This is preferable to embedding training techniques that cast prediction problems (where the representation of an augmented view of an image should be predictive of another augmented view of the image) directly in representation space, which may lead to collapsed representations (e.g., a representation that is constant across views is always fully predictive of itself). In this manner, it is possible to build sequential representations of increasing quality by iterating the training procedure using the embedding network as (new) target network.

Preferably, methods for training the embedding neural network may involve randomly initializing weights of a target embedding network (for predicting target representations). Random initialization is advantageous in that it avoids collapse of representation. The target embedding network may be at least partially the same as the (training) embedding network (that is, both networks may have the same underlying structure, including architecture, interconnections, processing nodes, etc.). Of course, the (transient) weights (including dropped out units) and biases may differ between the otherwise identical networks. Training the embedding neural network may seek to minimise a similarity loss function between the representations produced by the two embedding networks, where the embedding network may be optimised using, for example, backpropagation techniques. The inputs into each embedding network may be augmented copies of images. By augmenting the images prior to processing by the embedding networks, the embedding network seeks to predict the same representation as that determined by the target embedding network in a manner that is invariant to the augmentation(s) applied to the inputs.

Preferably, methods for training the embedding neural may use moving averages, for example an exponential moving average, of the main encoder weights (that is, of the embedding neural network) to update a second network's weights (that is, of the target embedding neural network).

Preferably, the augmentations applied to the images may be randomly selected from amongst a list of potential augmentations. In the case of 2D images, example augmentations include colour jittering, greyscale conversion, Gaussian blurring, horizontal flipping, vertical flipping, and random crop and resizing. Any combination of these augmentations may be suitable. Optionally, each augmentation may be applied entirely randomly (e.g., with a 50% probability of augmentation), or each augmentation may be applied with a distinct probability.

Preferably, training of the embedding network involves updating the weights of the target embedding neural network as a moving average (e.g., an exponential moving average) of the weights of the embedding neural network. In this way, the weights of the target network are able to represent a delayed (and thus more stable) version of the weights of the embedding network.

Optionally, training methods for the embedding network may involve symmetrising the network, for example, by separately feeding the input previously used for the embedding network into the target embedding network and vice versa. For instance, training the embedding network may comprise repeatedly cropping each training image and augmenting each cropped image twice, thereby generating a first augmented view and a second augmented view. By passing the first augmented view through the embedding neural network, methods obtain a first lower dimensional representation of the first augmented view, a first projection, and a first prediction. Similarly, by passing the second augmented view through the target embedding network, methods obtain a first lower dimensional representation of the second augmented view and a first target projection. Methods may then determine a first error, calculated between the first prediction and the first target projection. Optionally, these values may be normalized prior to error calculation. For symmetrisation purposes, methods may then pass the second augmented view through the embedding network to obtain a second lower dimensional representation of the second augmented view, a second projection, and a second prediction, and may pass the first augmented view through the target embedding neural network to obtain a second lower dimensional representation of the first augmented view and a second target projection. Methods may then determine a second error between the second prediction and the second target projection. Methods may then apply optimisation techniques (e.g., stochastic gradient descent optimisation) to minimize a function (e.g., a sum) of the first error and second error with respect to weights of embedding neural network.

Embodiments of another aspect include a data processing apparatus, which comprises means suitable for carrying out a method of an embodiment.

Embodiments of another aspect include a computer program comprising instructions, which, when the program is executed by a computer, cause the computer to carry out the method of an embodiment. The computer program may be stored on a computer-readable medium. The computer-readable medium may be non-transitory.

Hence, another aspect includes a non-transitory, computer-readable medium comprising instructions, which, when the program is executed by a computer, cause the computer to carry out the method of an embodiment.

The invention may be implemented in digital electronic circuitry, or in computer hardware, firmware, software, or in combinations thereof. The invention may be implemented as a computer program or a computer program product, i.e., a computer program tangibly embodied in a non-transitory information carrier, e.g., in a machine-readable storage device or in a propagated signal, for execution by, or to control the operation of, one or more hardware modules. A computer program may be in the form of a stand-alone program, a computer program portion, or more than one computer program, and may be written in any form of programming language, including compiled or interpreted languages, and it may be deployed in any form, including as a stand-alone program or as a module, component, subroutine, or other unit suitable for use in a data processing environment.

The invention is described in terms of particular embodiments. Other embodiments are within the scope of the following claims. For example, the steps of the invention may be performed in a different order and still achieve desirable results.

BRIEF DESCRIPTION OF THE DRAWINGS

Reference is made, by way of example only, to the accompanying drawings in which.

DETAILED DESCRIPTION

The field of object detection has benefitted from a dramatic increase in performance with the advancements of DL based computer vision techniques. The most significant advancements include region proposals through such techniques as R-CNN (Regions with CNN Features) and end-to-end region proposal and classification as proposed in Faster R-CNN. These approaches are typically defined as two-stage approaches: object region proposals are generated with one model, and the proposals are classified with different model. More recently, one-stage detectors have been proposed such as SSD (Single Shot MultiBox Detector), YOLO (You Only Look Once) and RetinaNet. One-stage detectors perform region proposals and classification in a single forward pass of a DL-based network. As a result, inference times are greatly improved.

For both one-stage and two-stage detectors, the training of each network follows a similar strategy. An input image is fed into a backbone network (e.g., VGG19 or ResNet), followed by a mapping from the input pixels to a set of object location proposals. Proposals are represented by vectors denoting the parameterisation of the (bounding) box. A common parameterisation is $p \in \mathbb{R}^4$ denoted by x, y, w, h where x, y are the pixel coordinates of the object centre, and w, h are the width and height of the object, respectively. For each proposal and classification, an ID is assigned from the classification model for two-stage detectors (and from the branch for one-stage detectors). The proposals are then mapped to a ground-truth set of proposals contained in a label file, which contains, for each object in the image, a vector-based parameterisation. Using, for example, gradient descent, the network is optimised to minimise the difference between the proposed objects and the ground-truth labels.

Figure 1:
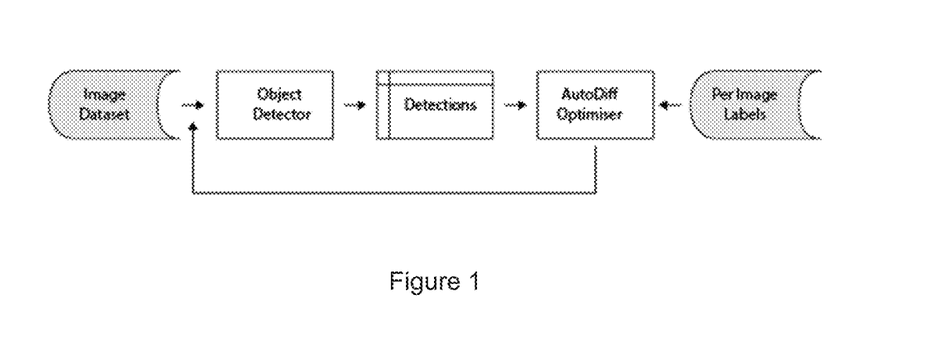
FIG. 1 is a high-level schematic of a known fully supervised object detection system.

FIG. 1 provides a high-level overview of an example (fully supervised) object detector pipeline. In training, images from a dataset are passed through an object detector to acquire proposed object coordinate detections. These proposed object coordinate detections and ground-truth, per image labels are passed through an AutoDiff optimiser to analytically determine gradients used for back-propagation of the object detector network, which updates the object detector network's parameters (e.g., weight and biases) such that the trained object detector may more accurately detect objects for which a ground-truth label is not provided.

Weakly-Supervised Object Detection

A key limitation of the object detection pipeline discussed in the section above is the requirement of per-image, per-object labels. Weakly-supervised learning is concerned with any variation of learning where this constraint is reduced to some extent. Weakly-supervised methods for object detection may be categorised broadly as: learning with inaccurate instances; learning with coarse labels (e.g., classification level labels); learning with noisy labels; learning with a domain shift; and learning with reduced labels. Learning with a domain shift, for example, refers to training a model using labels from one domain and testing it on a set of images from a different domain (e.g., train on synthetic images and test on real images). Reduced labels, for example, requires labelling of only a fraction of the objects within an image (e.g., 1 out of every 5 objects in the image); the label is still a spatial label, which needs to be provided as image coordinates with respect to a specific image. These methods all have a varying range of required supervision and expected performance.

Self-Supervised Representation Learning

Whilst not necessarily immediately connected to object detection tasks, self-supervised representation learning—a technique for training a machine learning model where the labels are automatically derived from the input—has been used for obtaining semantically rich representations of image datasets without the need for per-image labels. Typically, an underlying assumption is that two augmented views of the same image should have similar representations, whereas two augmented views of different images should have different representations. A common way to enforce this assumption in training is through contrast-loss learning. A key example of this technique is SimCLR (a simple framework for contrastive learning of visual representations). Another key assumption in SimCLR is that the images contain a single object which is generally centred and covers the majority of the image. This allows the user to take a random crop of the image and assume the foreground object is still contained within the cropped image. Contrastive loss also assumes a "negative" example, which is an image that represents a different class (that is, an image that includes a different class of object relative to the target image). Use of such negative examples is not always possible in many unlabelled datasets. However, recently proposed techniques such as Bootstrap Your Own Latent (BYOL) and SimSiam (simple Siamese representation learning) have shown that the negative example is not actually required-in fact, BYOL may be more robust to the choice of image augmentations than contrastive methods due to the lack of need to rely on negative examples. The inventors have realised that this observation is a key driver allowing for self-supervised representations to be used in an object detection scenario, as one may assume an image may contain multiple objects. Collecting negative samples over a single image would therefore not be possible without per-object spatial labels.

Recent attempts have been made to apply self-supervised learning to object detection, however the focus is on pre-training a backbone to improve performance in the supervised learning setting. The inventors are not aware of any work at present that directly uses self-supervised learnt representations to directly perform object localisation.

Embodiments of the present invention do not require the data used for training to be labelled. Instead, embodiments only require one or a small number of representative examples of the objects that need to be detected. With reference to the above categorisation of object detectors, embodiments fall into the category of weakly-supervised learning. However, within weakly-supervised learning, embodiments do not fall into any established sub-category.

Embodiments of neural network training methods disclosed herein remove the requirement for providing manual location labels. Instead, these are replaced by an "exemplar-based" labelling approach. An exemplar-based label is potentially a single example of an object class, that object provided as a foreground object in an image. In this context, a single label is the same as a single exemplar. An exemplar has no specific relationship with any one particular image, whereas a label (as we call it here) is the spatial coordinates in an image where the object is present. However, one may obtain an exemplar by extracting the part of the image bounded by a label (e.g., crop the image with the label bounding box). The key difference with embodiments relative to existing methods is in the way in which the exemplar is used. A label is only ever used with a specific image, whereas an exemplar may be used as a supervision signal across all images. Importantly, the cardinality (that is, the number of possible elements in the set) of exemplar-based labels is independent of the cardinality of an image dataset. This contrasts with supervised labels where the cardinality of the label-set and the dataset must be equal. Accordingly, the time and cost of labelling (with an exemplar-based approach) becomes essentially a constant, independent of the size of the dataset. The primary cost of increasing a dataset size is solely in the collection of the data, which—for images-scales considerably better than the cost of labelling for many practical tasks.

As an example of the above, consider a case of detecting a car in a set of images. Assuming the developer of the detector has received a collection of 1000 images containing cars, an existing detector would require all images to be labelled—i.e., a bounding box to be drawn around every car in every image. Leaving the negative impact of mislabelling aside, the developer would need to create thousands of bounding boxes. In contrast, application of embodiments to the same task would only require one (or a few) example(s) of labelled cars, independently of how many images would be provided. This greatly reduces both the labelling effort and the probability of mistakes.

Eliminating the cost of manual labelling enables the developer to potentially collect much larger datasets under the same (or cheaper) project budget. This improves the likelihood of collecting a denser sampling of the input space, which would in effect improve the performance of the final object detection system.

Figure 2:
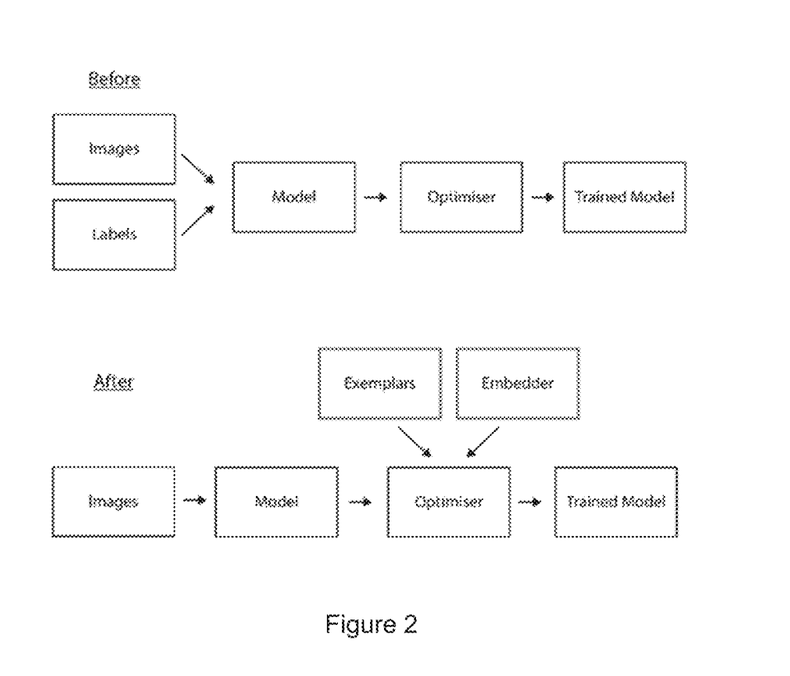
FIG. 2 is a high-level schematic comparison of a known object detection system and an object detection system according to embodiments.

FIG. 2 provides a schematic comparison between conventional object detector training methods (top), which require labels, and object detector training according to embodiments (bottom), which instead replaces labels with a small set of exemplars and an embedding network.

Using the process described herein, supervision occurs in a lower, more compact dimensional space than the original input space. This may avoid ambiguities that occur in the original space which result in missing labels, and thus avoids introducing the human visual system bias. This may improve the detector performance in scenarios where manual labelling is challenging and the manually labelled dataset contains many errors.

The key innovation is in the use of a learned data representation to guide detection proposals towards provided exemplars, present within the image, without ever providing the individual objects' spatial coordinates. This allows a user to train a generic object detection system without the requirement of per-image spatial labels. Instead, the user provides (at a minimum) a single exemplar of the object class that they wish to train the detector to locate. This may greatly reduce the cost of training data labelling required for most existing solutions, as well as potentially allowing for increased performance by using larger unlabelled datasets.

The invention is not related or limited to a specific model architecture, but is an approach for optimisation of an off-the-shelf object detector using a self-supervised embedding network. The use of per-image labels may be bypassed by using an embedding network and a cropping module. To enable optimisation of the system, the use of finite-difference differentiation may be used, replacing more typical auto-differentiation techniques.

Figure 3:
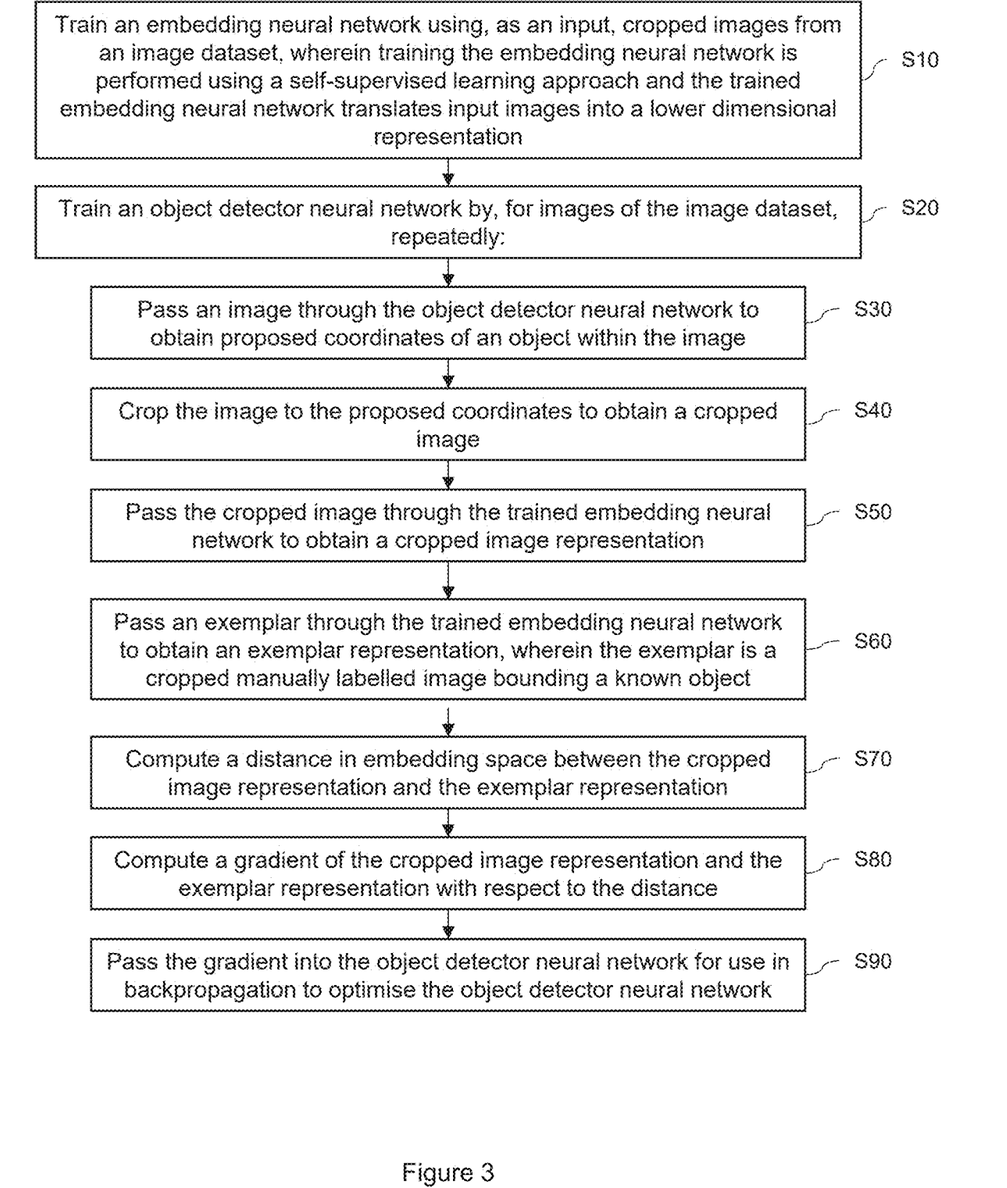
FIG. 3 is a flow chart of a method for training an object detector according to embodiments.

FIG. 3 is a flow chart depicting a computer-implemented method of training an object detector according to aspects of embodiments of the present invention. S10 trains an embedding neural network. S20 trains an object detector neural network by repeatedly using the trained embedding neural network (for each loop, e.g., for each forward and backwards pass of the network in training).

In more detail, S30 passes an image through the object detector, generating proposed object coordinates. S40 crops the image to the proposed coordinates. S50 passes the cropped image through the (now trained) embedding network, generating a representation of the cropped image in embedding space. S60 passes an exemplar through the embedding network, generating a representation of the exemplar in embedding space. S70 computes the distance between the two representations within the embedding space (which may be in n-dimensions). S80 computes the gradient of the two representations with respect to the distance. S90 passes—in an optimisation phase—the gradient into the object detector network during backpropagation. When a sufficient number of iterations have been performed, or when convergence to a predefined level has been met, the object detector may be said to be trained.

That is, at a high level, a system implementing the method performs the following processes:

1. Train an embedding network on cropped images from an image dataset using a self-supervised learning approach;
2. Run images through an object detector;
3. Crop original images using object proposals from step 2;
4. Pass the cropped images through the embedding network from step 1 along with any exemplars;
5. Compute the distance from the proposed cropped images and exemplars in embedding space;
6. Compute gradients with respect to the object detector output parameters and the distance from the cropped images to the exemplars;
7. Pass gradients into the object detector and optimise the network using back propagation;
8. Repeat steps 2-7 until network has converged;
9. Save final object detector state for use (all other networks are discarded).

Figure 4:
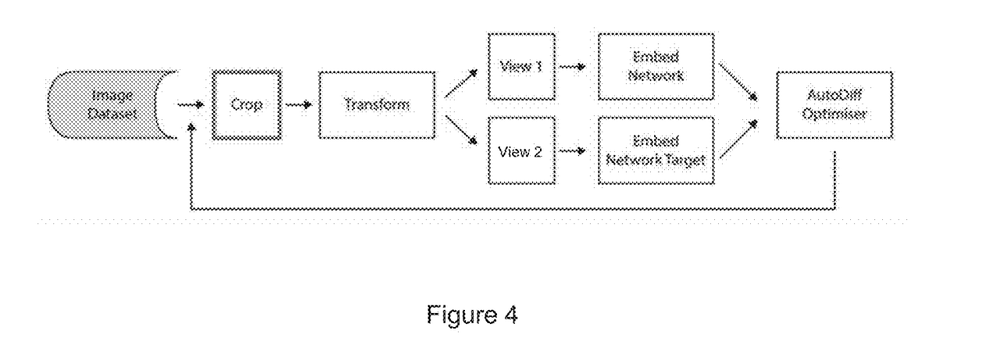
FIG. 4 is a schematic of training an embedding network according to embodiments.
Figure 5:
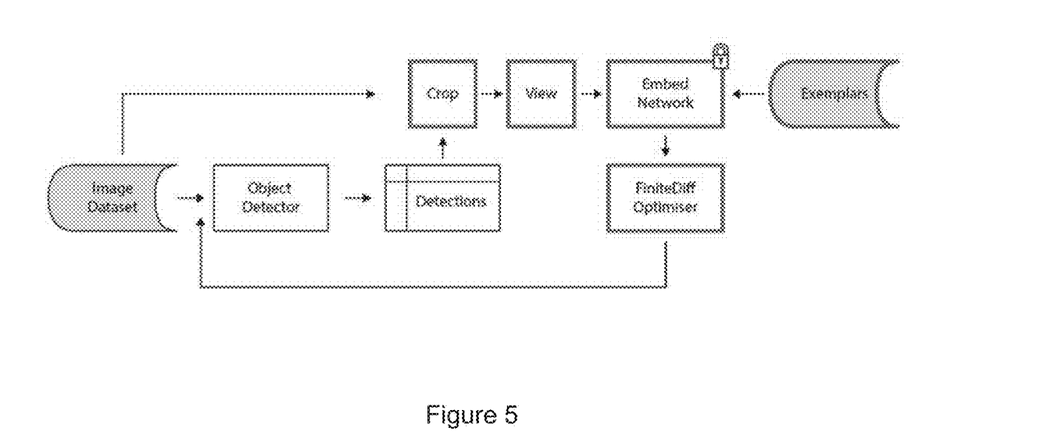
FIG. 5 is a schematic of training an object detector network according to embodiments.

The method of object detector training may be split into two stages: embedding network training (FIG. 4); and object detector training (FIG. 5).

1. Embedding Network Training

To train the embedding network, embodiments employ a generic self-supervised image representation learning (neural) network. As depicted in FIG. 4, given a single image, the training pipeline first crops a random patch from an image.

Note that the embedding network is, in fact, trained using a large corpus of images (as this is self-supervised, it is possible to train using an exceptionally large dataset as no labels are required). Therefore, each loop of the training procedure may pick N random images from the image dataset (corpus) and create N cropped images, which are fed to the embedding network(s). The subsequent loop may create new cropped images from the N randomly selected images or may select a further selection of random images from the image dataset. Cropping adapts known embedding networks from creating features suited for image classification to features suited for object detection. The crop acts within a pre-defined extent, set by the user. The extent depends on the expected size of the object(s) in the image dataset. For example, if the camera that acquires the image is in a fixed position and the objects are a fixed size and always following a fixed path (e.g., in a factory setting, for detecting defects along a production line), the extent of cropping would be known. For most cases, the extent may be variable and based on the minimum size one would expect in order to get a detection. For example, cropping of 8×8 pixels for up to around 75% of the image size is an appropriate cropping extent for the use case of autonomous driving.

After this stage, the image is transformed from having dimensions (H, W, 3) to (H−y, W−x, 3) where H is height, W is width, and x and y are random constants generated at runtime (note that 3 corresponds to the number of colour channels (RGB) in this example). This differs from existing approaches where the entire image is passed into a transform module. This process adapts the self-supervised representation to work on patches of the image, which mimic the area of the image covered by an individual detection from an object detector. This component is used for adapting the existing self-supervised representation learning network, which is designed for image classification, for use in the task of object detection.

The transform module performs a standard set of augmentations with a given probability. The augmentations used may include: colour jittering; greyscale conversion; Gaussian blurring; horizontal flipping; vertical flipping; and random crop and resizing. Each augmentation is applied with a given probability, such that it is possible that all augmentations are applied to a cropped image, and it is also possible that no augmentations are applied to the cropped image. The output of the transform module is two views of the cropped image. Table 1 below provides suitable example probabilities for each augmentation for both first and second views (see below).

TABLE 1

Image augmentations and associated probabilities

| Augmentation<br>Explanation of augmentation | Probability<br>First view | Probability<br>Second view |
|---|---|---|
| Colour jittering<br>Brightness, contrast, saturation, and hue (order random) of image are shifted by a uniformly random offset applied on all the pixels of the same image. | 0.8 | 0.8 |
| Greyscale conversion<br>Output intensity for pixel (r, g, b) corresponds to its luma component, computed as 0.2989 r + 0.5870 g + 0.1140 b | 0.2 | 0.2 |
| Gaussian blurring<br>For a 224×224 image, a square Gaussian kernel of size 23×23 is used, with standard deviation uniformly sampled over [0.1, 2.0] | 1.0 | 0.1 |
| Horizontal flipping | 0.5 | 0.5 |
| Vertical flipping | 0.5 | 0.5 |
| Random crop and resizing<br>Random patch of image is selected with area uniformly sampled between 8% and 100% of original image and aspect ratio logarithmically sampled between ¾ and 4/3. Patch resized to target size of 224×224 using bicubic interpolation. | 1.0 | 1.0 |

The first view is passed into the embedding network that is to be used for object detection training. The second view is passed into a secondary network (a target embedding network), which is structurally the same as the embedding network (same underlying node architecture) however has a different set of learnable parameters (neural network weights). In one example, these learnable parameters may be updated as an exponential moving average of the parameters (weights) of the embedding network.

The embedding network is optimised using an AutoDiff optimiser (which uses gradient-based optimisation techniques to derive the gradient(s) analytically). The primary task is for the embedding network to predict the output of the target embedding network. This encourages the embedding network to become invariant to the transformations in the transform module.

Once the embedding network has been trained to convergence (or once a pre-determined number of iterations have completed), the embedding network's state (that is, the underlying weights and biases of the trained encoder of the embedding network) is frozen and extracted from the pipeline for implementation within the object detection training (as indicated with the lock icon on the trained embedding network in FIG. 5).

2. Object Detection Training

To train the object detector network, embodiments employ a generic object detection system, as depicted in FIG. 5 (note that the first three components are the same components as those in FIG. 1). The key difference in embodiments is the use of the trained embedding network to bypass the need for labels.

Preferably, the object detection training uses the same images as used to train the embedding network. It is not necessary that all object detector training images are used for training the embedding network, however it is desirable that the entire distribution of the image dataset should at least be represented. For example, consider the training of an object detector for the purpose of object detection in autonomous vehicles using an autonomous driving dataset that contains arid desert, inter-city, and snowy mountain scenes. At least a sampling of each should be included in the embedding network training for best practise. The skilled person will appreciate that this is not, however, a strict constraint.

As with the embedding network training, it is preferable that object detector is trained using many images. Again, as no manual labels are required, the key advantage of embodiments is that this dataset may be very large.

The object detector network outputs a N×4 bounding box regression ($x_{min}$, $y_{min}$, $x_{max}$, $y_{max}$) (which may be converted to (x, y w, h)) and an N×K classification score. K here is the number of classes. This vector may be passed through a softmax function to turn the vector into a probability distribution, as is standard with image classification tasks. There may be, for example, an associated lookup table mapping each of the K indices to a class title. For each exemplar, the user knows the class (as this was manually selected) and, by computing the distance to the nearest exemplar, the classification branch/model may use that exemplars class as the supervision signal for training.

Once detections have been predicted, the (proposed) pixel coordinates of the objects are used to crop the patch of the input image to which they correspond. This results in a set of n images with dimensions (h≤H, w≤W, 3) where h, w are the new height and width sizes and H, W are the original input image height and width. As the magnitude of h, w and the ratio h/w may be different for each detection, each cropped image may be resampled to a set value.

Figure 6:
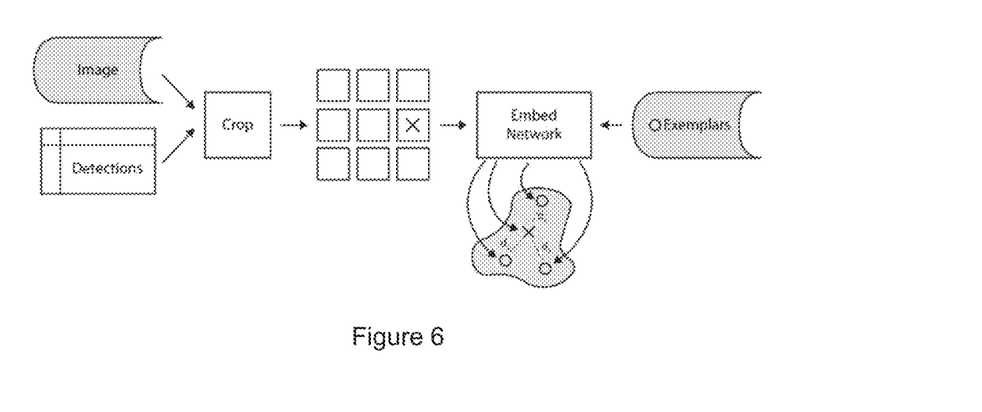
FIG. 6 is a schematic of mapping objection detections and exemplars into embedding space according to embodiments.

FIG. 6 is a diagram of this aspect of the invention. Each of the crops are then passed into the pre-trained embedding network and an output vector value is obtained with a predefined dimension (FIG. 6, X). Similarly, exemplar images (at least one) are also passed into the embedding network and their corresponding vector values are computed (FIG. 6, O). For each cropped image vector, the distance to each exemplar vector is computed. The network may then be optimised with a view to minimise the distance between each cropped image and each cropped image's closest exemplar in the learned metric space. Distance here is defined as the Euclidean distance in n-dimensions.

The minimum number of exemplars is 1. The number of exemplars required is dependent on the intra-class variation of the object. For example, if there are 5 designs of lamppost, 5 exemplars would be optimum. For objects with higher intra-class variation such as cars, a coarse sampling of the entire distribution should be obtained. For example, an exemplar of a hatchback, van, SUV, coupe, etc. Realistically, a car class would require approximately 50-100 to be effective on a large scale. Use of too many exemplars may eventually become problematic as a nearest neighbour search needs to be undertaken to find the closest exemplar. Using efficient data structures (e.g., K-D Tree) or more advanced approximate nearest neighbours (e.g., FLANN (Fast Library for Approximate Nearest Neighbors)) may somewhat alleviate this problem up to a limit. However, given the capacity of a modern computer, the inventor's do not envisage a scenario where the number of exemplars would be too high that nearest neighbour searching becomes too inefficient to be practical.

Figure 7:
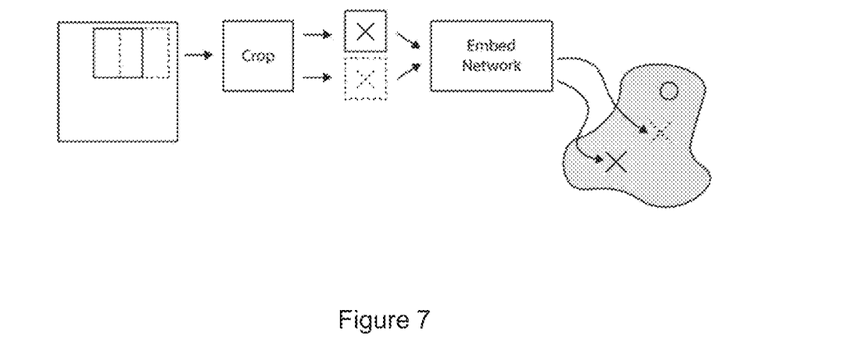
FIG. 7 is a schematic of a finite-difference technique for gradient-based optimisation according to embodiments.

Common DL libraries (e.g., PyTorch and Tensorflow) rely on analytical automatic differentiation to compute parameter gradients with respect to a cost function. Instead, embodiments may utilise a numerical differentiation approach for the cropping function, realised through the finite difference method. As seen in FIG. 5, a FiniteDiff optimiser may be used (which uses gradient-based optimisation techniques that derive the gradient(s) numerically using a finite-difference method). FIG. 7 illustrates this method schematically. In this example, the finite difference method is used for the x pixel position parameter. The original prediction (solid line) moves closer to the exemplar in embedding space by a small shift of the crop in the x direction in input space.

For each parameter in input space (y, x, h, w) where y, x are pixel coordinates, a small & shift is added (giving a shifted cropped image). That is, for example, there may be 4 distinct shifts resulting in 5 embeddings (the original and one for each parameter). A typical shift value may be 3 pixels; this value is chosen empirically and works well on a range of datasets. The value should be sufficient that the visual offset is noticeable, but not so much that the gradient (s) becomes too large. The cropped image from the object detector and the exemplars may be resized to a fixed size.

The gradient is computed as the difference of distance from the original vector (FIG. 5, solid X) and the δ vector (FIG. 5, dotted X). That is, the gradient for the each of the four parameters is then (parameter embedding—original embedding). The gradient is the difference between the delta distance (for each parameter independently) and the original (no delta) distance. These distances are calculated by measuring the Euclidean distance between the embedding vectors (delta and original) with the closest exemplar embedding vector.

In other words, the finite difference method computes whether a small shift in parameters makes the resulting cropped image more similar to the exemplar in embedding space. This gradient is then input into an auto-differentiation engine to optimise the object detector.

Any object detector that predicts a standard parameterisation (for example, $(x_{min}, y_{min}, x_{max}, y_{max})$ or (x, y, h, w)) is able to benefit from techniques disclosed herein.

Worked Example

Figure 8:
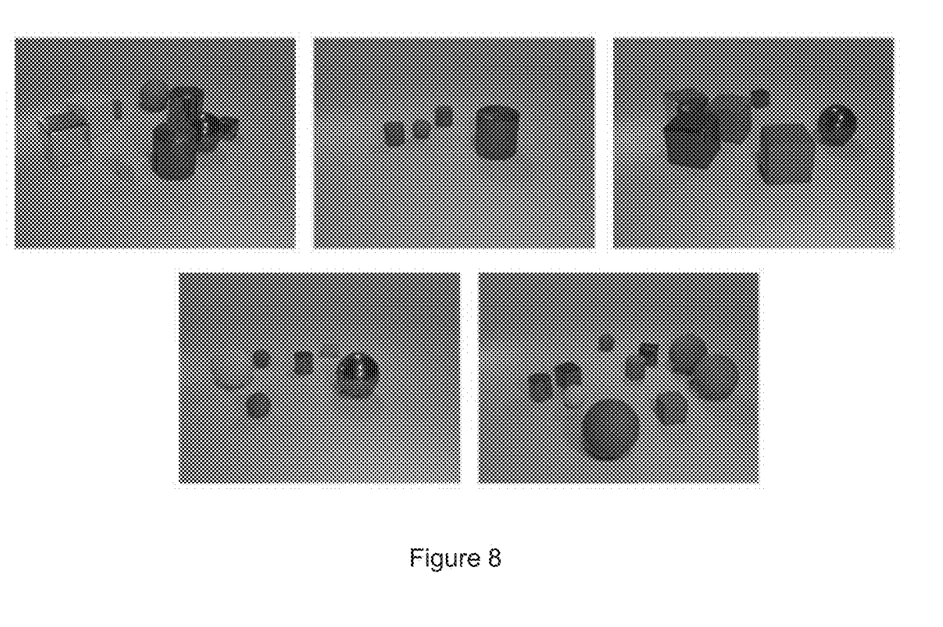
FIG. 8 is a collection of example images from a training dataset.

The following worked example applies an embodiments for the detection of objects in the 2D image CLEVR dataset. FIG. 8 provides example images from the CLEVR dataset. The dataset contains 75,000 training images containing combinations of three object shapes (cube, sphere, and cylinder) that come in two absolute sizes (small and large), two materials (shiny "metal" and matte "rubber"), and eight colours. The total number of labels (that is, the total number of exemplars) used for the dataset in the worked example is six. In contrast, for supervised learning, over 550,000 labels would be required.

Worked Example: Embedding Network

The worked example adopts BYOL self-supervised representation learning network, which is modified through the addition of a cropping stage. The final output layer is amended to the desired dimensionality d of the embedding space. In this example d=128; this value is large enough that it may capture the complexity and not so large that we move into very high dimension spaces where the distances would likely become unreliable. Other values may be chosen to adapt to other desired classification benchmark scores; for instance, d=256 may work well with the ImageNet classification benchmark. The network is trained using the standard method as proposed by the original authors in BYOL.

BYOL uses a convolutional residual network with 50 layers and post-activation (ResNet-50 (1×) v1) as the base parametric encoders $f_\theta$ and $f_\xi$. BYOL also uses deeper (50, 101, 152 and 200 layers) and wider (from 1× to 4×) ResNets. Specifically, the representation y corresponds to the output of a final average pooling layer, which has a feature dimension of 2048 (for a width multiplier of 1×). The representation y is projected to a smaller space by a multi-layer perceptron (MLP) $g_\theta$, and similarly for the target projection $g_\xi$. This MLP consists in a linear layer with output size 4096 followed by batch normalization, rectified linear units (ReLU), and a final linear layer with output dimension 128 (as described in the above paragraph). The output of this MLP is not batch normalized. The predictor $q_\theta$ uses the same architecture as $g_\theta$.

Training or optimising uses the LARS optimiser with a cosine decay learning rate schedule, without restarts, over 1000 epochs, with a warm-up period of 10 epochs. The worked example sets the base learning rate to 0.2, scaled linearly with the batch size (Learning Rate=0.2× BatchSize/ 256). In addition, the worked example uses a global weight decay parameter of $1.5 \cdot 10^6$ while excluding the biases and batch normalization parameters from both LARS adaptation and weight decay. For the target network, the exponential moving average parameter t starts from $\tau_{base}=0.996$ and is increased to one during training. Specifically, the worked example sets $\tau \triangleq 1-(1-\tau_{base}) \cdot (\cos(\pi k/K)+1)/2$ with k the current training step and K the maximum number of training steps. The worked example uses a batch size of 4096 split over 512 Cloud TPU v3 cores. With this setup, training takes approximately 8 hours for a ResNet-50 (×1).

Figure 9:
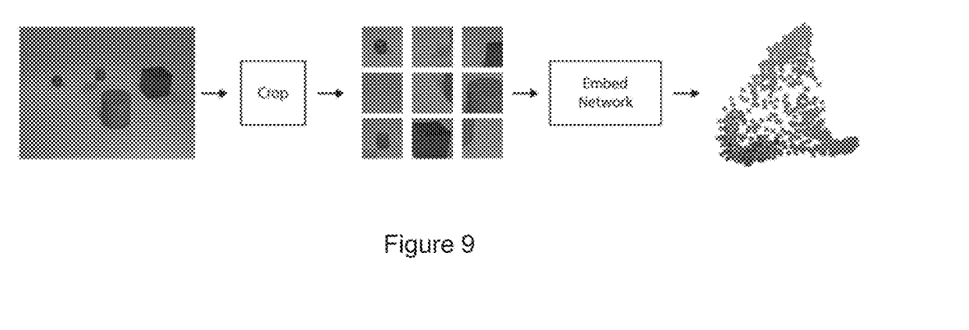
FIG. 9 is a schematic of application of a trained embedding network, mapping cropped training images into embedding space using principal component analysis.

FIG. 9 is a schematic overview of use of the trained embedding neural network in the worked example, including the preliminary cropping stage. Example embeddings are projected from 128-dimensions to 2-dimensions using Principal Component Analysis. Note how all crops containing an object occupy a specific spatial area of the embedding space (lower left sector of the 2D embedding space depiction).

Worked Example: Object Detector

The worked example implements the object detector component of the pipeline using the RetinaNet network. The skilled person will appreciate, however, that any other state-of-the-art detector could be used.

RetinaNet is a single, unified network composed of a backbone network and two task-specific subnetworks. The one-stage RetinaNet network architecture uses a Feature Pyramid Network (FPN) backbone on top of a feedforward ResNet architecture to generate a rich, multi-scale convolutional feature pyramid. To this backbone RetinaNet attaches two subnetworks, one for classifying anchor boxes and one for regressing from anchor boxes to ground-truth object boxes.

RetinaNet is trained with stochastic gradient descent (SGD). The worked example uses synchronized SGD over 8 GPUs with a total of 16 images per minibatch (2 images per GPU). All models are trained for 90 k iterations with an initial learning rate of 0.01, which is then divided by 10 at 60 k and again at 80 k iterations. Weight decay of 0.0001 and momentum of 0.9 are used. The training loss is the sum the focal loss and the standard smooth $L_1$ loss used for box regression. Note that these values are largely training specific hyper-parameters, which may be altered depending on the dataset in use.

To improve performance, embodiments may process all crops (and their delta shifts or offsets) in a single batch. In practice, this requires at least 12 GB of GPU memory to be effective. This is not however a hard limitation of the method and may easily be relaxed at the cost of computation time.

Figure 10:
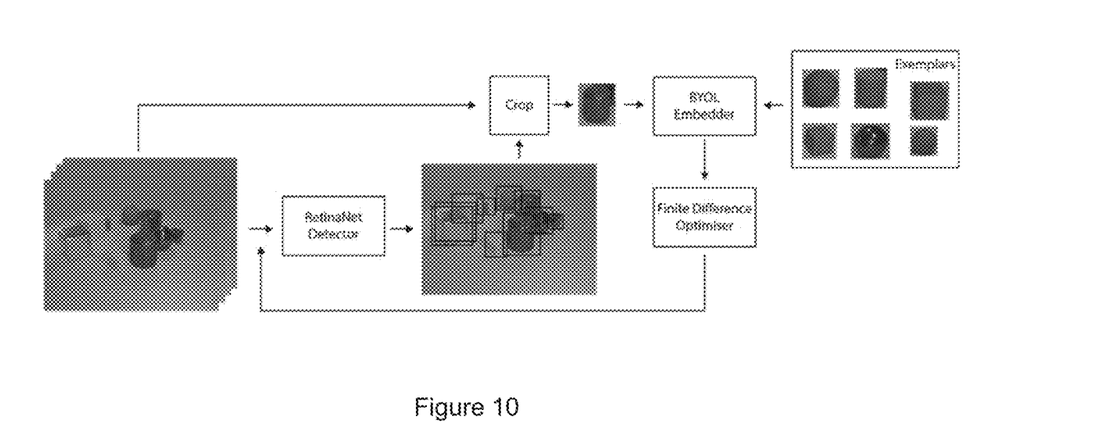
FIG. 10 is a schematic of training an object detector using a trained embedding network.

FIG. 10 shows the full worked example using the CLEVR dataset. Six exemplars are selected at random. The cropping module is implemented as a standard 'crop and resize' function so that all crops have a set size of 64×64 pixels. Both exemplars and crops from the detector undergo this transformation.

Worked Example: Use Cases

Embodiments of the present invention are, of course, suited for training object detectors for use in any field in which object detectors are put to use. Generally, embodiments may serve the technical purpose of digital image and/or video enhancement and/or analysis. That is, embodiments are well suited for the task of classification of (and more specifically, the classification and detection of objects within) digital images and/or videos based on low-level features.

Benefits of embodiments may be seen when operating in a learned metric space and, therefore, are not dependant on the input signal. A learned metric space is a low-dimensional vector representation of the original signal. For example, an image may be mapped from (H×W×3) to (1×128) (as described above). Similarly, a video may be mapped from (H×W×T×3) to (1×128) and 3D points may be mapped from (N×3) to (1×128). Each signal simply needs differentiable mapping tools (e.g., a convolution). The object training described herein operates in the (1×128) (learned metric) space (though of course the dimensionality of this space is simply an example), so the nature of the input signal is not important.

Considering this, embodiments may also be applied to alternative signals such as video. This field has established detection networks and embedding techniques. Once embedded into a learned metric space, embodiments may be applied as in the case with 2D signals described throughout.

More specifically, embodiments may be applied to such example use-cases as railway mapping and autonomous driving detection.

With the use-case of mapping of railways, techniques described herein are well suited as many features of railways are standardised and, therefore, work particularly well with an exemplar-based learning system. For example, a single example of a specific component would provide enough information to learn to detect all instances of the specific component. An extreme example of this would be a track clip, which is used to pin the rail to the sleepers and occurs in pairs every 1 m or so across entire railway networks.

With the use-case of autonomous driving detection, techniques described herein are well suited as collecting very large amounts of data (for use in training) is easily attainable by placing sensors on existing manually driven vehicles. The expected classes for detection, however, remains reasonably finite (for example: car, person, animal, streetlight, traffic light etc.).

The skilled person will appreciate that embodiments may be applied to 3D sensed data, such as point cloud datasets acquired using, for example, LiDAR techniques or photogrammetry. With respect to the 2D worked example object detector and embedding network described above, this would require replacement for their 3D counterparts (e.g., PointNet++, KPConv, VoteNet, etc.). Both networks would be reimplemented using 3D alternatives for classic 2D operators. For example, 2D convolutions would be replaced by 3D point convolutions.

Hardware

Figure 11:
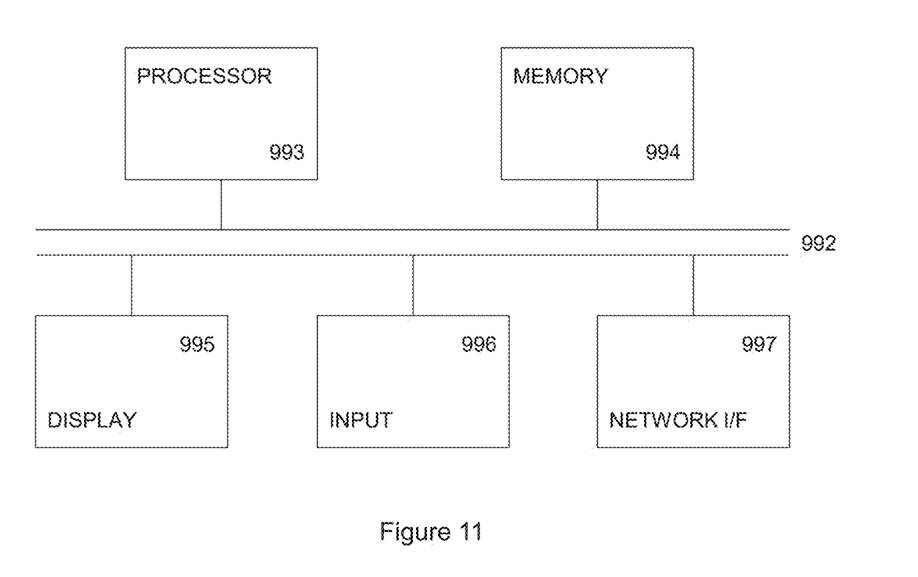
FIG. 11 is a diagram of suitable hardware for implementation of embodiments.

FIG. 11 is a block diagram of a computing device, such as a data storage server, which embodies the present invention and which may be used to implement aspects of the methods for training an object detector, as described herein. The computing device comprises a processor 993, and memory 994. Optionally, the computing device also includes a network interface 997 for communication with other computing devices.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994 may include a computer readable medium, a term which may refer to a single medium or multiple media (e.g., a centralised or distributed database and/or associated caches and servers) configured to carry computer-executable instructions or have data structures stored thereon. Computer-executable instructions may include, for example, instructions and data accessible by and causing a general-purpose computer, special purpose computer, or special purpose processing device (e.g., one or more processors) to perform one or more functions or operations. Thus, the term "computer-readable storage medium" may also include any medium that is capable of storing, encoding, or carrying a set of instructions for execution by the machine and that cause the machine to perform any one or more of the methods of the present disclosure. The term "computer-readable storage medium" may accordingly be taken to include, but not be limited to, solid-state memories, optical media, and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device 400 and to execute processing operations, for example executing code stored in the memory 404 to implement the various different functions of the object detector training method, as described here and in the claims.

The memory 994 may store data being read and written by the processor 993, for example data from training tasks executing on the processor 993. As referred to herein, a processor 993 may include one or more general-purpose processing devices such as a microprocessor, central processing unit, GPU, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 993 may also include one or more special-purpose processing devices such as an application specific integrated circuit (ASIC), a field programmable gate array (FPGA), a digital signal processor (DSP), network processor, or the like. In one or more embodiments, a processor 993 is configured to execute instructions for performing the operations and steps discussed herein.

The network interface (network I/F) 997 may be connected to a network, such as the Internet, and is connectable to other computing devices via the network. The network I/F 997 may control data input/output from/to other apparatuses via the network.

Methods embodying aspects of the present invention may be carried out on a computing device such as that illustrated in FIG. 11. Such a computing device need not have every component illustrated in FIG. 11 and may be composed of a subset of those components. A method embodying aspects of the present invention may be carried out by a single computing device in communication with one or more data storage servers via a network or by a plurality of computing devices operating in cooperation with one another. Cloud services implementing computing devices may be deployed.

The invention claimed is:

1. A computer-implemented method of training an object detector, the method comprising:
    training an embedding neural network using, as an input, cropped images from an image dataset, wherein training the embedding neural network is performed using a self-supervised learning approach and the trained embedding neural network translates input images into a lower dimensional representation; and
    training an object detector neural network by, for images of the image dataset, repeatedly:
        passing an image through the object detector neural network to obtain proposed coordinates of an object within the image,
        cropping the image to the proposed coordinates to obtain a cropped image,
        passing the cropped image through the trained embedding neural network to obtain a cropped image representation,
        passing an exemplar through the trained embedding neural network to obtain an exemplar representation, wherein the exemplar is a cropped manually labelled image bounding a known object,
        computing a distance in embedding space between the cropped image representation and the exemplar representation,
        computing a gradient of the cropped image representation and the exemplar representation with respect to the distance using a finite difference method, wherein the finite difference method includes:
            cropping the image to the proposed coordinates with a shift to obtain a shifted cropped image,
            passing the shifted cropped image through the trained embedding neural network to obtain a shifted cropped image representation,
            computing a second distance in embedding space between the shifted cropped image representation and the exemplar representation, and
            computing the gradient as the difference between the distance and the second distance, and
        passing the gradient into the object detector neural network for use in backpropagation to optimise the object detector neural network.

2. The method of claim 1, further comprising: optimising the object detector neural network by minimising the distance between the cropped image representation and the exemplar representation using the gradient in backpropagation.

3. The method of claim 2, wherein optimising the object detector neural network comprises minimising a distance-based loss function for each cropped image representation of the images and the exemplar representation.

4. The method of claim 3, wherein the distance-based loss function corresponds to a sum of $L_1$ loss and focal loss for each cropped image representation and the exemplar representation.

5. The method of claim 1, wherein training the object detector neural network further comprises scaling each cropped image such that all scaled cropped images are of the same size.

6. The method of claim 5, further comprising scaling the exemplar such that the scaled exemplar is the same size as the scaled cropped images.

7. The method of claim 1, wherein the method uses a plurality of exemplars for repeatedly training the object detector neural network, the method further comprising:
    obtaining an exemplar representation for each exemplar, and
    computing the distance and the gradient for each cropped image with respect to each exemplar representation.

8. The method of claim 7, wherein the method uses at least the same number of exemplars as there are classes of objects to be detected.

9. The method of claim 1, further comprising randomly initializing weights of a target embedding neural network, the target embedding neural network comprising the same structure as the embedding neural network, and wherein training the embedding neural network comprises, for images of the image dataset, repeatedly:
    augmenting a cropped image to generate a first augmented view and a second augmented view;
    passing the first augmented view through the embedding neural network to obtain a lower dimensional representation of the first augmented view;
    passing the second augmented view through the target embedding network to obtain a lower dimensional representation of the second augmented view;
    minimising a similarity loss between the embedding neural network and the target embedding network using stochastic gradient descent optimisation with respect to the weights of the embedding neural network.

10. The method of claim 9, wherein the stochastic gradient descent optimisation comprises updating the weights of the target embedding neural network as a moving average of the weights of the embedding neural network.

11. The method of claim 9, wherein augmenting the cropped image comprises applying at least one of the following augmentations:
colour jittering;
greyscale conversion;
Gaussian blurring;
horizontal flipping;
vertical flipping; and
random crop and resizing, optionally wherein
augmenting the cropped image comprises probabilistically applying a plurality of augmentations to the cropped image, each augmentation applied with a corresponding probability.

12. The method of claim 1, wherein the method is for detecting an object in an image enhancement or analysis process.

13. The method of claim 12, wherein the method is for detecting an object in an autonomous vehicle image analysis process.

14. The method of claim 12, wherein the method is for detecting an object in a railway mapping image analysis process.

15. A computer-implemented method of object detection, the method comprising:
training an embedding neural network using, as an input, cropped images from an image dataset, wherein training the embedding neural network is performed using a self-supervised learning approach and the trained embedding neural network translates input images into a lower dimensional representation; and
training an object detector neural network by, for images of the image dataset, repeatedly:
passing an image through the object detector neural network to obtain proposed coordinates of an object within the image,
cropping the image to the proposed coordinates to obtain a cropped image,
passing the cropped image through the trained embedding neural network to obtain a cropped image representation,
passing an exemplar through the trained embedding neural network to obtain an exemplar representation, wherein the exemplar is a cropped manually labelled image bounding a known object,
computing a distance in embedding space between the cropped image representation and the exemplar representation,
computing a gradient of the cropped image representation and the exemplar representation with respect to the distance using a finite difference method, wherein the finite difference method includes:
cropping the image to the proposed coordinates with a shift to obtain a shifted cropped image,
passing the shifted cropped image through the trained embedding neural network to obtain a shifted cropped image representation,
computing a second distance in embedding space between the shifted cropped image representation and the exemplar representation, and
computing the gradient as the difference between the distance and the second distance, and
passing the gradient into the object detector neural network for use in backpropagation to optimise the object detector neural network;
receiving an input image;
passing the input image into the trained object detector neural network; and
outputting coordinates and object class of any objects detected within the input image.

16. A data processing apparatus comprising a memory and a processor, the memory comprising instructions which, when executed by the processor:
train an embedding neural network using, as an input, cropped images from an image dataset, wherein training the embedding neural network is performed using a self-supervised learning approach and the trained embedding neural network translates input images into a lower dimensional representation; and
train an object detector neural network by, for images of the image dataset, repeatedly:
passing an image through the object detector neural network to obtain proposed coordinates of an object within the image,
cropping the image to the proposed coordinates to obtain a cropped image,
passing the cropped image through the trained embedding neural network to obtain a cropped image representation,
passing an exemplar through the trained embedding neural network to obtain an exemplar representation, wherein the exemplar is a cropped manually labelled image bounding a known object,
computing a distance in embedding space between the cropped image representation and the exemplar representation,
computing a gradient of the cropped image representation and the exemplar representation with respect to the distance using a finite difference method, wherein the finite difference method includes:
cropping the image to the proposed coordinates with a shift to obtain a shifted cropped image,
passing the shifted cropped image through the trained embedding neural network to obtain a shifted cropped image representation,
computing a second distance in embedding space between the shifted cropped image representation and the exemplar representation, and
computing the gradient as the difference between the distance and the second distance, and
passing the gradient into the object detector neural network for use in backpropagation to optimise the object detector neural network.

17. A non-transitory computer readable medium having a computer program stored thereon, wherein the computer program, when executed by a computer, cause the computer to:
train an embedding neural network using, as an input, cropped images from an image dataset, wherein training the embedding neural network is performed using a self-supervised learning approach and the trained embedding neural network translates input images into a lower dimensional representation; and
train an object detector neural network by, for images of the image dataset, repeatedly:
passing an image through the object detector neural network to obtain proposed coordinates of an object within the image,
cropping the image to the proposed coordinates to obtain a cropped image,
passing the cropped image through the trained embedding neural network to obtain a cropped image representation,
passing an exemplar through the trained embedding neural network to obtain an exemplar representation, wherein the exemplar is a cropped manually labelled image bounding a known object,
computing a distance in embedding space between the cropped image representation and the exemplar representation,
computing a gradient of the cropped image representation and the exemplar representation with respect to the distance using a finite difference method, wherein the finite difference method includes:
cropping the image to the proposed coordinates with a shift to obtain a shifted cropped image,
passing the shifted cropped image through the trained embedding neural network to obtain a shifted cropped image representation,
computing a second distance in embedding space between the shifted cropped image representation and the exemplar representation, and
computing the gradient as the difference between the distance and the second distance, and
passing the gradient into the object detector neural network for use in backpropagation to optimise the object detector neural network.

18. A computer-implemented method of training an object detector, the method comprising:
training an embedding neural network using, as an input, cropped images from an image dataset, wherein training the embedding neural network is performed using a self-supervised learning approach and the trained embedding neural network translates input images into a lower dimensional representation; and
training an object detector neural network by, for images of the image dataset, repeatedly:
passing an image through the object detector neural network to obtain proposed coordinates of an object within the image,
cropping the image to the proposed coordinates to obtain a cropped image,
passing the cropped image through the trained embedding neural network to obtain a cropped image representation,
passing a plurality of exemplars through the trained embedding neural network to obtain a corresponding plurality of exemplar representations, wherein each exemplar is a cropped manually labelled image bounding a known object, and wherein the method uses at least the same number of exemplars as there are classes of objects to be detected,
computing a distance in embedding space between the cropped image representation and the plurality of exemplar representations,
computing a gradient of the cropped image representation and the exemplar representations with respect to the distance, and
passing the gradient into the object detector neural network for use in backpropagation to optimise the object detector neural network.

19. A computer-implemented method of training an object detector, the method comprising:
training an embedding neural network using, as an input, cropped images from an image dataset, wherein training the embedding neural network is performed using a self-supervised learning approach and the trained embedding neural network translates input images into a lower dimensional representation; and
training an object detector neural network by, for images of the image dataset, repeatedly:
passing an image through the object detector neural network to obtain proposed coordinates of an object within the image,
cropping the image to the proposed coordinates to obtain a cropped image,
passing the cropped image through the trained embedding neural network to obtain a cropped image representation,
passing an exemplar through the trained embedding neural network to obtain an exemplar representation, wherein the exemplar is a cropped manually labelled image bounding a known object,
computing a distance in embedding space between the cropped image representation and the exemplar representation,
computing a gradient of the cropped image representation and the exemplar representation with respect to the distance, and
passing the gradient into the object detector neural network for use in backpropagation to optimise the object detector neural network,
the method further comprising randomly initializing weights of a target embedding neural network, the target embedding neural network comprising the same structure as the embedding neural network, and wherein training the embedding neural network comprises, for images of the image dataset, repeatedly:
augmenting a cropped image to generate a first augmented view and a second augmented view;
passing the first augmented view through the embedding neural network to obtain a lower dimensional representation of the first augmented view;
passing the second augmented view through the target embedding network to obtain a lower dimensional representation of the second augmented view; and
minimising a similarity loss between the embedding neural network and the target embedding network using stochastic gradient descent optimisation with respect to the weights of the embedding neural network.

20. The method of claim 19, wherein the stochastic gradient descent optimisation comprises updating the weights of the target embedding neural network as a moving average of the weights of the embedding neural network.

* * * * *